Patented July 15, 1947

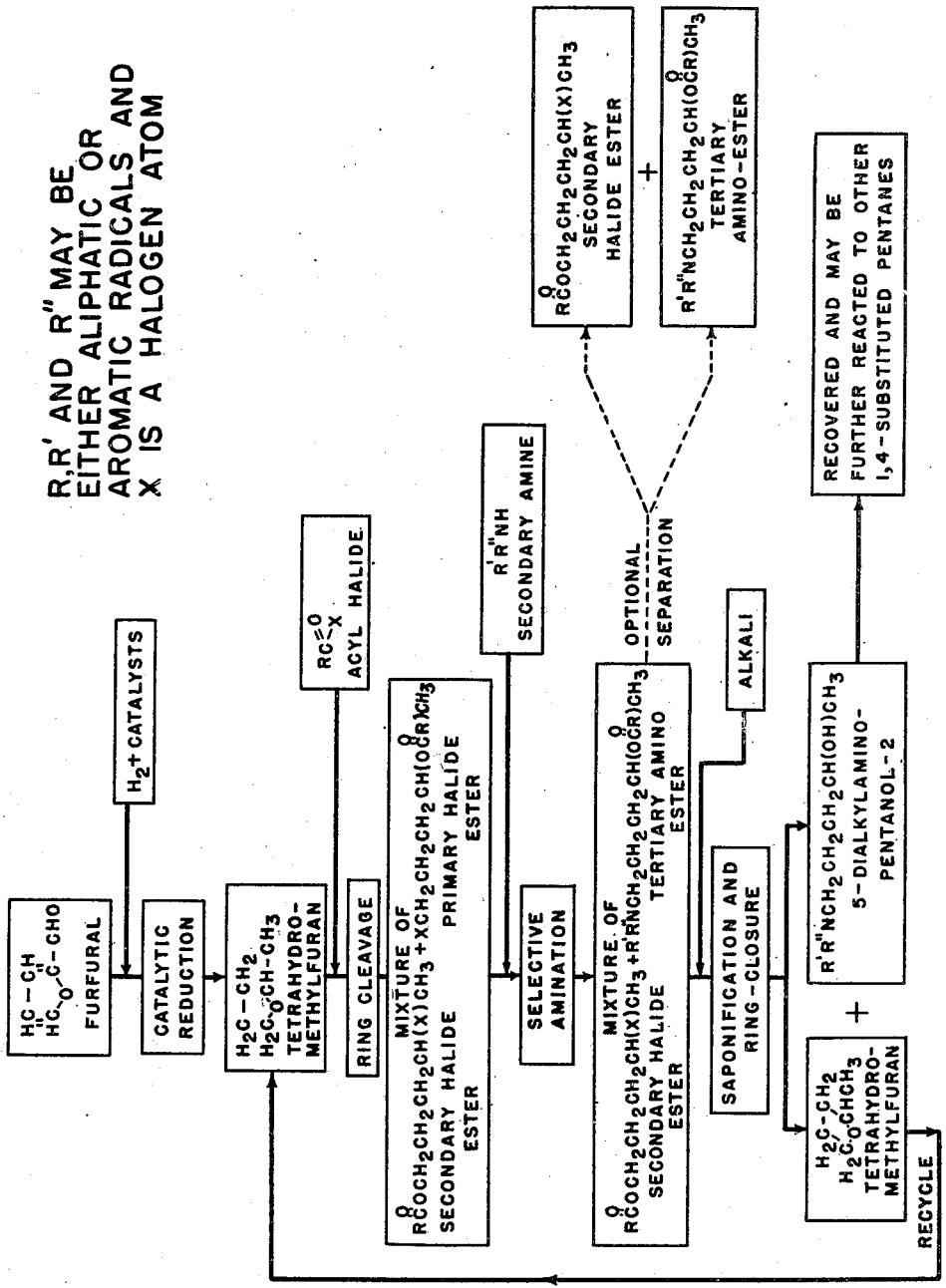

2,424,184

UNITED STATES PATENT OFFICE 2,424,184

TERTIARY AMINO PENTANOLS AND ESTERS THEREOF

Samuel A. Morell, Peoria, Ill., assignor to the Government of the United States, as represented by the Secretary of Agriculture Application March 16, 1945, Serial No. 583,137

9 Claims. (Cl. 260—490)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new process for the manufacture of 1,4-substituted pentanes. Such compounds are useful intermediates in the synthesis of valuable pharmaceuticals.

In the prior art these intermediates have generally been made by building them up from simpler carbon structures using well-known chemical reactions. I have found that it is possible to prepare these intermediates from compounds already existing in nature containing the required carbon skeleton, thereby making it unnecessary to construct them through laborious syntheses. I have found that these materials can be made from the inexpensive raw material, furfural, which has the following structure:

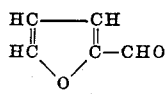

In general, my process comprises reacting furfural as its hydrogenated derivative (tetrahydromethylfuran) with an acyl halide, such as acetyl bromide, benzoyl chloride, furoyl iodide, p-nitrobenzoyl bromide, chloroacetyl chloride, et cetera. The resulting reaction is exothermic and should be controlled at a temperature not exceeding about 200° C., preferably about 50°–150° C., depending upon the particular intermediate which is being made. This reaction results in the production of a mixture of isomeric primary and secondary halides, as indicated by the following reaction mechanism:

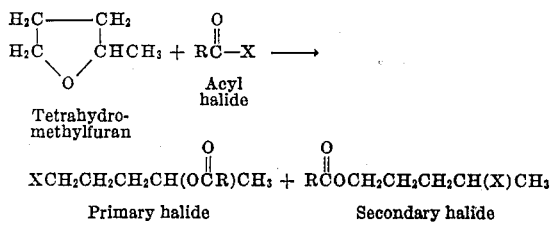

Where X is a halogen atom and R may be either an aliphatic or aromatic radical. By the use of the terms "aliphatic" or "aromatic" it is to be understood that both substituted and unsubstituted radicals are included. This mixture of reaction products is then further reacted with a secondary amine, R'R''NH, where R' and R'' may be either aliphatic or aromatic radicals, such as diethylamine, methylethylamine, diphenylamine, p-nitrophenylethylamine, etc., under such conditions that the primary halide component is substantially the only one affected, resulting in the formation of the corresponding tertiary amine. The resulting two products, namely, the tertiary amine and the secondary halide, may be separated and each component further processed individually. However, I found it unnecessary to make the separation and can further react both ester components simultaneously by saponification. In the case of the tertiary amine, normal saponification occurs with the formation of the corresponding tertiary-amino-alcohol, whereas in the case of the secondary halide the reaction results in ring-closure to reform tetrahydromethylfuran which may be recycled, while the tertiary-amino-alcohol is recovered. My process may be better understood by reference to the accompanying flow diagram where the reactions described above are illustrated. The homologues of 5-dialkylamino-pentanol-2, which are obtained in good yield by my process, may be converted to other useful 1,4-substituted pentanes by means of well-known chemical reactions, such as halogenation, amination, esterification, oxidation, etc. The various 1,4-substituted pentanes which occur as intermediates in my process may also, if so desired, be isolated.

In practicing my invention it is important that the ring-cleaving acyl halide react with the tetrahydromethylfuran (2-methyl tetrahydrofuran) in equimolar ratio so that two isomeric halogeno-amyl-esters are formed as indicated in the above equation. It is, furthermore, an important aspect of my invention that the relative proportions of the two isomers so formed can be varied within wide limits by merely changing the conditions, particularly the temperature, employed in conducting the ring-cleavage reaction. Thus, for example, if it is desired to prepare 4-halogeno-n-amyl esters in good yield, I conduct the reaction at a relatively low temperature, not to exceed about 50°–60° C., but on the other hand, if the ring-cleavage reaction is to be used as an intermediate step for making esters of 5-dialkylamino-pentanol-2, or of their corresponding carbinols, in which case it is then desirable to preferentially form the other isomer; i. e., esters of 5-halogeno-pentanol-2, then I conduct the reaction at considerably higher temperatures, approximately 100°–200° C. I have found that a very convenient way to control these temperatures is to conduct the reactions in suitable inert solvents possessing the desired boiling ranges, although the reactions proceed equally well without using any solvent. As an illustration of the extent to which the relative proportions of the two isomeric halogeno-amyl-esters may be varied by the conditions which are used in conducting the ring-cleavage reaction, the following data were obtained when acetyl bromide was used as the acyl halide and the selective reaction with diethylamine was used to analyze for the amount of the primary bromide which had formed.

| Conditions used in conducting the ring-cleavage reaction | Relative distribution of isomeric bromo-amyl-esters | |
|---|---|---|
| | Primary bromide (Acetate of 5-bromo-pentanol-2) | Secondary bromide (Acetate of 4-bromo-pentanol-1) |
| | Per Cent | Per Cent |
| Reactants mixed and temperature maintained at 50°–60° C | 39.0 | 61.0 |
| Reactants mixed and temperature maintained at 70°–80° C | 45.7 | 54.3 |
| Reactants mixed and temperature maintained at 90°–100° C | 63.2 | 36.8 |
| Bromide added to boiling tetrahydromethylfuran with stirring and temperature rose spontaneously to 121° C | 88.4 | 11.6 |

A novel feature of my invention is the chemical separation of the mixture of primary and secondary halogeno-amyl-esters by selective condensation of the primary halide isomer with a secondary amine, which reaction, when conducted as hereinafter shown, is substantially quantitative, none of the secondary halide isomer undergoing condensation. To illustrate this specificity the acetate of 4-bromo-pentanol-1, for example, does not react with diethylamine under the conditions employed in practicing my invention, whereas under the same conditions, the acetate of 5-bromo-pentanol-2 reacts practically quantitatively to form the 1,4-substituted tertiary amino-amyl acetate. This selective amination reaction, furthermore, appears to be rather general for 1,4-substituted halogeno-esters as a class, for I have found that homologous primary halogeno-esters, like the acetate of 4-bromo-butanol-1 for example, also reacted practically quantitatively with secondary amines to form the corresponding tertiary amino-butyl-esters.

Another novel feature of my invention is that whereas the saponification of the esters of 5-dialkylamino-pentanol-2 proceeds in a normal manner; i. e., with the formation of the corresponding carbinols, the saponification of 1,4-substituted halogeno-amyl-esters proceeeds in a very anomalous manner; i. e., with the quantitative formation of tetrahydromethylfuran, as indicated by the following equation, where M is an alkaline earth or alkali metallic atom and $n$ is an integer corresponding to the valence of M:

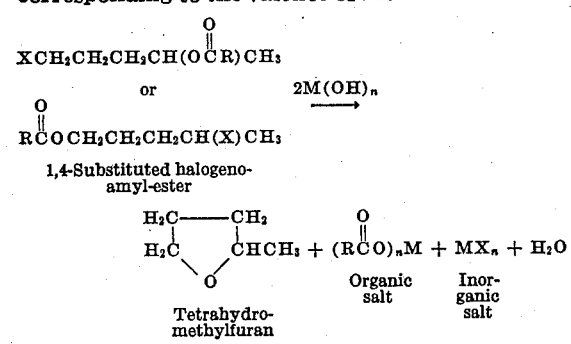

This type of reaction appears to be quite general for 1,4-substituted halogeno-esters as a class, for not only do the 1,4-halogeno-amyl-esters, like the acetates of 5-bromo-pentanol-2 or of 4-bromo-pentanol-1 for example, react in this manner, but I have also found that 1,4-substituted butyl esters, like the acetate of 4-bromo-butanol-1 for example, react quantitatively in an identical manner;

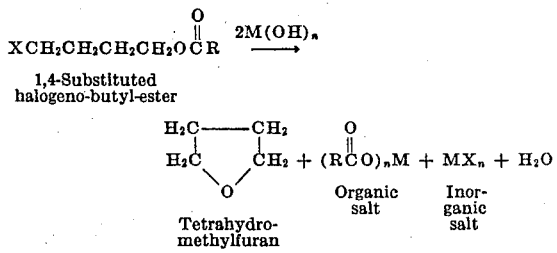

In conducting the saponification it is convenient to remove the tetrahydromethylfuran as it is formed (B. R.=70°–71° C. for the water-azeotrope), for if it is permitted to remain in the reaction mixture, the complete saponification of the esters of the 5-diethylamino-pentanol-2 is somewhat retarded. After completing the saponification, the liberated carbinol, 5-diethylamino-pentanol-2, separates from the aqueous saponification mixture as a light oil which is easily removed and, if desired, purified by distillation. The anomalous ring-closure reaction of 1,4-substituted halogeno-amyl-esters is very advantageous when it is desired to prepare homologues of 5-dialkylamino-pentanol-2, for in this manner the undesired ester of 4-halogeno-pentanol-1 is reconverted to tetrahydromethylfuran for reuse in the process.

The following examples illustrate my invention.

*Example 1*

In a reaction vessel equipped with a reflux condenser, an agitator, and a suitable means for heating, was placed 86 parts of tetrahydromethylfuran which was then heated to its boiling point (80° C.). Heating was discontinued and 123 parts of acetyl bromide was added slowly while the mixture was stirred. In one hour, all of the bromide had been added and the reaction temperature had risen to 116° C. On distillation in vacuo, a main fraction of 188 parts of the mixture of isomeric bromo-amyl-acetates; i. e., the acetates of 5-bromo-pentanol-2 and of 4-bromo-pentanol-1, was obtained, B. R. 82°–87° C./3 mm. $n_D^{24°}=1.4561$, which amounted to a yield of 90 percent of that required by theory. The mixture exhibited the following analysis:

| For $C_7H_{13}O_2Br$ | C | H | Br | Acetyl | Saponification equivalent |
|---|---|---|---|---|---|
| Theory requires | 40.17 | 6.26 | 38.2 | 20.5 | 104.6 |
| Found | 40.24 | 6.08 | 38.4 | 20.3 | 104.8 |

The mixture (188 parts) was was placed in the same reaction vessel and 350 parts of toluene and 150 parts of diethylamine were added. The solution was heated for 12 hours at about 90° C. (steam at atmospheric pressure). The crystalline diethylamine hydrobromide which had formed as a result of the reaction was then removed by filtration, 111 parts being obtained, which showed that 80 percent of the mixture of isomeric bromo-amyl-acetates had reacted with the diethylamine. The reflux condenser attached to the reaction vessel was replaced by a suitable distilling column and the excess diethylamine and the toluene solvent were then recovered by distillation. To the residue was added 666 parts of 3 normal sodium hydroxide and, with constant agitation, the mixture was heated to boiling. In two hours the water-azeotrope of tetrahydromethylfuran (B. R. 70°–71° C.) had ceased distilling, 15 parts of pure tetrahydromethylfuran being recovered, or 97 percent of that required by theory based on the amount of the bromo-amylacetate which had not reacted with the diethylamine. Boiling of the reaction mixture was then continued under total-reflux for an additional 10 hours, when saponification of the tertiary amino-acetate was complete. After cooling to 25° C., the crude tertiary amino-carbinol, which separated as a light oil from the aqueous solution, was then removed and combined with an ether extract of the aqueous solution, which extract removed the small amount of the carbinol that had remained dissolved. On distillation in vacuo, 92 parts of pure 5-diethylamino-pentanol-2, B. R. 78°–80° C./3 mm. $n_D^{23°}=1.4438$, was obtained, which amounted to 80 percent of that required by theory based on the amount of the bromo-amyl-acetate which had reacted with the diethylamine. The product exhibited the following analysis:

| For $C_9H_{21}ON$ | C | H | N | Neutral equivalent |
|---|---|---|---|---|
| Theory requires | 67.87 | 13.29 | 8.80 | 159.3 |
| Found | 67.88 | 13.14 | 8.82 | 159.5 |

Based on the amount of tetrahydromethylfuran which had been consumed in the process (i. e., 71 parts, for 86 parts were initially used and 15 parts were recovered) the yield of the 5-diethylamino-pentanol-2 was 70 percent of that required by theory.

*Example 2*

Eighty-six parts of tetrahydromethylfuran was treated as described in Example 1, but the mixture of isomeric bromo-amyl-acetates obtained on reaction with acetyl bromide was not isolated by distillation previous to reaction with diethylamine. The yields of regenerated tetrahydromethylfuran and 5-diethylamino-pentanol-2 were substantially the same as in Example 1.

*Example 3*

Eighty-six parts of tetrahydromethylfuran was dissolved in 350 parts of toluene, the solution was brought to a boil and 123 parts of acetyl bromide was added as described in Example 1. After cooling to about 90° C., 150 parts of diethylamine was added and the reaction mixture was worked up as described in Example 1. The yields of regenerated tetrahydromethylfuran and 5-diethylamino-pentanol-2 were substantially the same as in Example 1.

*Example 4*

In a reaction vessel equipped with an agitator and a suitable means for cooling was placed 86 parts of tetrahydromethylfuran and 123 parts of acetyl bromide. The exothermic reaction which resulted was controlled by maintaining the temperature at 50°–60° C. In two hours the reaction was completed as evidenced by no further evolution of heat. On distillation in vacuo, a main fraction of 190 parts of the mixture of isomeric bromo-amyl-acetates; i. e., the acetates of 5-bromo-pentanol-2 and 4-bromo-pentanol-1, was obtained, which amounted to a yield of 91 percent of that required by theory. The mixture (190 parts) was dissolved in 350 parts of toluene and reacted at about 90° C. with 150 parts of diethylamine. The crystalline diethylamine hydrobromide which had formed as a result of the reaction was then removed by filtration, 55 parts being obtained which showed that 39 percent of the mixture of isomeric bromo-amyl-acetates had reacted with the diethylamine. The excess diethylamine in the filtrate was then removed by distillation (B. R.=55°–56° C.) and the residue was extracted with 500 parts of normal hydrochloric acid.

On distillation of the toluene phase in vacuo there was obtained 112 parts of the acetate of 4-bromo-pentanol-1, B. R. 80°–82° C./3 mm., $n_D^{25°}=1.4562$, which amounted to a yield of 96 per cent of that required by theory based on the amount of the bromo-amyl-acetate which had not reacted with the diethylamine. This product, which did not react on further heating with an excess of diethylamine in toluene, exhibited the following analysis:

| For $C_7H_{13}O_2Br$ | Br | Acetyl | Saponification equivalent |
|---|---|---|---|
| Theory requires | 38.2 | 20.5 | 104.6 |
| Found | 38.2 | 20.4 | 104.3 |

The aqueous acidic phase obtained from the above extraction was made alkaline with 500 parts of normal sodium hydroxide, extracted with toluene and on distillation in vacuo there was obtained 56 parts of the acetate of 5-diethylamino-pentanol-2, B. R. 85°–87° C./3 mm., $n_D^{24°}=1.4298$, which amounted to a yield of 78 percent of that required by theory based on the amount of the bromo-amyl-acetate which had reacted with the diethylamine. The product exhibited the following analysis:

| For $C_{11}H_{23}O_2N$ | C | H | N | Acetyl | Neutral equivalent |
|---|---|---|---|---|---|
| Theory requires | 65.63 | 11.51 | 6.96 | 21.4 | 201.3 |
| Found | 65.54 | 11.78 | 6.99 | 21.1 | 202.2 |

Based on the amount of tetrahydromethylfuran which had been used, the yield of the acetate of 5-diethylamino-pentanol-2 was 28 percent and that of the acetate of 4-bromo-pentanol-1 was 54 percent, or a combined yield of 82 percent of that required by theory.

*Example 5*

Eighty-six parts of tetrahydromethylfuran was treated as described in Example 4, but the mixture of isomeric bromo-amyl-acetates obtained on reaction with acetyl bromide was not isolated by distillation previous to reaction with diethylamine. The acetates of 5-diethylamino-pentanol-2 and of 4-bromo-pentanol-1 were obtained in substantially the same yield as in Example 4.

*Example 6*

Eighty-six parts of tetrahydromethylfuran was converted to 5-diethylamino-pentanol-2 as described in Example 1. The carbinol so obtained was boiled under reflux for 3 hours with 5 times its weight of 48 percent hydrobromic acid. On concentration in vacuo at 100° C., the residue spontaneously crystallized as the hydrobromide salt of 5-diethylamino-2-bromo-pentane. Based on the amount of carbinol used, the yield was practically quantitative.

Having thus described the invention, what is claimed is:

1. A method of manufacturing 1,4-substituted pentanes which comprises reacting 2-methyl tetrahydrofuran with an acyl halide to form a mixture of isomeric primary and secondary halogeno-amyl-esters, adding a secondary amine to form with the primary halide a tertiary amino-amyl-ester and then adding an alkali to the resulting mixture and heating it whereby a 5-dialkylamino-pentanol-2 is formed from the tertiary amino-amyl-ester and 2-methyl tetrahydrofuran is simultaneously reformed from the secondary halide.

2. A method of manufacturing 1,4-substituted pentanes which comprises reacting 2-methyl tetrahydrofuran with an acyl halide to form a mixture of isomeric primary and secondary halogeno-amyl-esters, adding a secondary amine to the mixture and separating the resulting ester of 5-dialkylamino-pentanol-2 from the unreacted ester of 4-halogeno-pentanol-1.

3. A method of manufacturing 1,4-substituted pentanes which comprises reacting 2-methyl tetrahydrofuran with acetyl bromide to form a mixture of isomeric primary and secondary bromo-amyl-acetates, adding a secondary amine to form with the primary bromide a tertiary amino-amyl-acetate and then adding an alkali to the resulting mixture and heating it whereby a 5-dialkylamino-pentanol-2 is formed from the tertiary amino-amyl-acetate and 2-methyl tetrahydrofuran is simultaneously reformed from the secondary bromide.

4. A method of manufacturing 1,4-substituted pentanes which comprises reacting 2-methyl tetrahydrofuran with an acyl halide to form a mixture of isomeric primary and secondary halogeno-amyl-esters, adding diethylamine to form with the primary halide an ester of 5-diethylamino-pentanol-2 and then adding an alkali to the resulting mixture and heating it whereby 5-diethylamino-pentanol-2 is formed from its ester and 2-methyl tetrahydrofuran is simultaneously reformed from the secondary halide.

5. A method of manufacturing 1,4-substituted pentanes which comprises reacting 2-methyl tetrahydrofuran with acetyl bromide to form a mixture of isomeric primary and secondary bromo-amyl-acetates, adding diethylamine to form with the primary bromide the acetate of 5-diethylamino-pentanol-2 and then adding an alkali thereto the resulting mixture and heating it whereby 5-diethylamino-pentanol-2 is formed from its acetate and 2-methyl tetrahydrofuran is simultaneously reformed from the secondary bromide.

6. A method of manufacturing 1,4-substituted pentanes which comprises reacting 2-methyl tetrahydrofuran with acetyl bromide to form a mixture of isomeric primary and secondary bromo-amyl-acetates, adding a secondary amine to the mixture and separating the resulting acetate of 5-dialkylamino-pentanol-2 from the unreacted acetate of 4-bromo-pentanol-1.

7. A method of manufacturing 1,4-substituted pentanes which comprises reacting 2-methyl tetrahydrofuran with an acyl halide to form a mixture of isomeric primary and secondary halogeno-amyl-esters, adding diethylamine to the mixture and separating the resulting ester of 5-diethylamino-pentanol-2 from the unreacted ester of 4-halogeno-pentanol-1.

8. A method of manufacturing 1,4-substituted pentanes which comprises reacting 2-methyl tetrahydrofuran with acetyl bromide to form a mixture of isomeric primary and secondary bromo-amyl-acetates, adding diethylamine to the mixture and separating the resulting acetate of 5-diethylamino-pentanol-2 from the unreacted acetate of 4-bromo-pentanol-1.

9. A method of manufacturing 1,4-substituted pentanes which comprises reacting 2-methyl tetrahydrofuran with an acyl halide to form a mixture of isomeric primary and secondary halogeno-amyl-esters, adding a secondary amine to form a tertiary amino-amyl-ester, adding an alkali to the resulting mixture and heating it, whereby a 5-dialkylamino-pentanol-2 is formed from the tertiary amino-amyl-ester and 2-methyl tetrahydrofuran is simultaneously reformed from the secondary halide, separating the resulting two components and recycling the 2-methyl tetrahydrofuran.

SAMUEL A. MORELL.

REFERENCES CITED

The following references are of record in the file of this patent:

UNITED STATES PATENTS

| Number | Name | Date |
|---|---|---|
| 2,235,534 | Russell | Mar. 18, 1941 |

OTHER REFERENCES

Beilstein, "Handbuch der Org. Chem.," 4th ed., vol. IV, page 159, ibid (second supp.), p. 641.

Smorgonskii et al., Chemical Abstracts (1941), vol. 35, p. 4011.

Chemical Abstracts (1937), p. 4593, vol. 31.

Chemical Abstracts (1938), p. 423, vol. 32.